(12) United States Patent
Pollock et al.

(10) Patent No.: US 11,232,480 B1
(45) Date of Patent: Jan. 25, 2022

(54) PREFERENCE-BASED ADVERTISING SYSTEMS AND METHODS

(75) Inventors: Bruce Pollock, Omaha, NE (US); Erika Nelson Kessenger, Denver, CO (US)

(73) Assignee: Intrado Corporation, Omaha, NE (US)

( * ) Notice: Subject to any disclaimer, the term of this patent is extended or adjusted under 35 U.S.C. 154(b) by 1468 days.

(21) Appl. No.: 12/977,414

(22) Filed: Dec. 23, 2010

(51) Int. Cl.
*G06Q 30/02* (2012.01)
*G06Q 50/00* (2012.01)

(52) U.S. Cl.
CPC ..... *G06Q 30/0252* (2013.01); *G06Q 30/0249* (2013.01); *G06Q 30/0273* (2013.01); *G06Q 50/01* (2013.01)

(58) Field of Classification Search
USPC .......................................................... 705/14
See application file for complete search history.

(56) References Cited

U.S. PATENT DOCUMENTS

| | | | | |
|---|---|---|---|---|
| 2002/0078441 A1* | 6/2002 | Drake | ................ | H04N 7/17318 725/9 |
| 2002/0162115 A1* | 10/2002 | Bruckner | ......... | H04N 21/25866 725/105 |
| 2003/0018967 A1* | 1/2003 | Gorbatov | ............. | H04N 21/435 725/32 |
| 2003/0063407 A1* | 4/2003 | Zimmerman | .......... | H04N 5/783 360/68 |
| 2004/0010798 A1* | 1/2004 | Galli | ...................... | H04N 7/163 725/28 |
| 2006/0159128 A1* | 7/2006 | Chen | ...................... | H04H 60/43 370/486 |
| 2007/0294740 A1* | 12/2007 | Drake | .............. | H04N 21/44222 725/131 |
| 2008/0040742 A1* | 2/2008 | Howcroft | ......... | H04N 21/25866 725/34 |
| 2008/0083003 A1* | 4/2008 | Biniak | ............... | H04N 21/2668 725/110 |
| 2008/0147497 A1* | 6/2008 | Tischer | ............. | G06Q 30/0264 705/14.61 |
| 2008/0167943 A1* | 7/2008 | O'Neil | ................... | G06Q 30/02 705/7.34 |
| 2008/0270164 A1* | 10/2008 | Kidder | ............... | G06Q 30/0241 705/14.4 |
| 2009/0106103 A1* | 4/2009 | Milana et al. | .................. | 705/14 |
| 2009/0150224 A1* | 6/2009 | Lu | .......................... | G06Q 30/02 705/7.29 |
| 2009/0254931 A1* | 10/2009 | Pizzurro | ................ | G06Q 30/02 725/5 |

(Continued)

*Primary Examiner* — Eric R Netzloff (57) ABSTRACT

The illustrative embodiments described herein provide systems and methods for managing advertisements for advertisers. In one embodiment, a method includes receiving a set of advertising preferences from an advertiser. The set of advertising preferences includes advertiser-definable criteria controlling when to initiate an advertisement associated with the advertiser. The method also includes monitoring a set of events associated with event data to determine whether to initiate the advertisement during an event. The set of events are viewable on an interfacing device associated with a user. The method also includes initiating the advertisement during the event in response to the event data for the event meeting the criteria defined by the advertiser.

16 Claims, 7 Drawing Sheets

(56) References Cited

U.S. PATENT DOCUMENTS

| | | | |
|---|---|---|---|
| 2010/0107194 A1* | 4/2010 | McKissick | H04N 21/47214 725/40 |
| 2010/0198655 A1* | 8/2010 | Ketchum | G06Q 20/10 705/14.58 |
| 2010/0205562 A1* | 8/2010 | de Heer | H04N 21/23424 715/810 |
| 2010/0255899 A1* | 10/2010 | Paulsen | G07F 17/32 463/25 |
| 2010/0269058 A1* | 10/2010 | Othmer et al. | 715/774 |
| 2011/0035277 A1* | 2/2011 | Kodialam | G06Q 30/02 705/14.46 |
| 2011/0179445 A1* | 7/2011 | Brown | G11B 27/28 725/32 |
| 2011/0264511 A1* | 10/2011 | Zhang | G06Q 30/02 705/14.43 |

* cited by examiner

FIG. 1

MY VIEWING PREFERENCES

SPORTS  NOTIFICATION SETTINGS ⌐242
FOOTBALL ☐ ALERT ME WHEN ANY FAVORITE TEAM IS WITHIN THE 20 YARD LINE
☐ SMS  ☐ TV POPUP  ☐ EMAIL

MY TEAMS
☐ ALERT ME WHEN THE "EXCITEMENT FACTOR" FOR A FAVORITE TEAM GAME
1. DALLAS COWBOYS        EXCEEDS [80 ▼] ⌐270
2. NEW ORLEANS SAINTS    BASED ON ☐ FRIEND RATINGS ☐ TWITTER COMMENTS ☐ OTHER ☐ ALL
3. DENVER BRONCOS
4. OAKLAND RAIDERS
5. CHICAGO BEARS
[CHANGE] ⌐240

SPECIAL EVENTS  NOTIFICATION SETTINGS ⌐242
ENTERTAINMENT  ☐ ALERT ME OF AN UPCOMING SPECIAL EVENT [5 ▼] DAYS BEFORE IT AIRS
☐ SMS  ☐ TV POPUP  ☐ EMAIL

MY EVENTS
☐ ALERT ME WHEN THE "EXCITEMENT FACTOR" FOR AN EVENT
1. ACADEMY AWARDS        EXCEEDS [80 ▼] ⌐270
2. GRAMMY AWARDS         BASED ON ☐ FRIEND RATINGS ☐ TWITTER COMMENTS ☐ OTHER ☐ ALL
3. MTV MUSIC AWARDS
4. EMMY AWARDS          EVENT PREFERENCES (ACADEMY AWARDS)
[CHANGE] ⌐244  ☐ ALERT ME REAL-TIME WHEN THE FOLLOWING EVENT AIRS:
          ☐ BEST ACTRESS AWARD    ☐ BEST DOCUMENTARY PICTURE
          ☐ BEST ACTOR AWARD      ☐ BEST PICTURE AWARD

ADVERTISING MANAGEMENT INTERFACE

MY ADS

1. 30 SECOND TONIGHT SHOW
2. 30 SECOND THE OFFICE
3. 60 SECOND FALL PREVIEW
4. 30 SECOND ROCK
5. ...

[CHANGE PRIORITY] — 282

DYNAMIC ADVERTISING PREFERENCES — 283

☐ AUTOMATICALLY PURCHASE AD SPACE* WHEN VIEWER SWITCHES TO A PROGRAM EXCEEDING AN EXCITEMENT LEVEL OF [80 ▼] FOR MY TOP [2 ▼] PRIORITY ADVERTISING CAMPAIGNS. — 284

☐ AUTOMATICALLY PURCHASE AD SPACE* WHEN VIEWER EXCITEMENT RATING FOR A PROGRAM EXCEEDS [80 ▼] FOR MY TOP [4 ▼] PRIORITY ADVERTISING CAMPAIGNS. — 284

☐ AUTOMATICALLY PURCHASE AD SPACE* WHEN [10,000 ▼] OR MORE VIEWERS SWITCH TO THE FOLLOWING PROGRAM: [____]

* UP TO THE PRICING THRESHOLD LIMITS I HAVE DEFINED BELOW

NOTIFICATION PREFERENCES

☐ PER PROGRAM ADVERTISING LIMIT: [$10,000 ▼]
☐ PER DAY ADVERTISING LIMIT: [$10,000 ▼]
☐ PER MONTH ADVERTISING LIMIT: [$10,000 ▼]

— 281

PRICING THRESHOLDS — 286

PREFERENCE-BASED ADVERTISING SYSTEMS AND METHODS

BACKGROUND

1. Field

The present invention relates generally to systems and methods for managing advertisements. More particularly, the present invention relates to preference-based advertising systems and methods.

2. Description of the Related Art

With the rise of the Internet and other means by which to rapidly communicate large volumes of data, an unprecedented number of television programs, movies, videos, and other viewable events have become available to the public. With this increased variety of programming and viewership come increased advertising opportunities for advertisers, forcing advertisers to make choices regarding the placement of their advertisements. However, current systems may fail to provide advertisers with the ability to dynamically place their ads according to real-time user viewing conditions, especially when the user is given greater control over the events that he or she watches. These current systems may also fail to take into account advertisers' budgetary constraints, program popularity, and other conditions to dynamically place advertisements in accordance with advertiser preferences.

SUMMARY

The illustrative embodiments described herein are directed to a data processing system and, in particular, to systems and methods for managing advertisements for advertisers. In one embodiment, a method includes receiving a set of advertising preferences from an advertiser. The set of advertising preferences includes advertiser-definable criteria controlling when to initiate an advertisement associated with the advertiser. The method also includes monitoring a set of events associated with event data to determine whether to initiate the advertisement during an event. The set of events are viewable on an interfacing device associated with a user. The method also includes initiating the advertisement during the event in response to the event data for the event meeting the criteria defined by the advertiser.

In another embodiment, a method for managing advertisements for advertisers includes receiving a set of advertising preferences from an advertiser. The set of advertising preferences includes advertiser-definable criteria defining when to initiate an advertisement associated with the advertiser. The method also includes monitoring a set of events associated with event data. The set of events are viewable on an interfacing device associated with a user. The set of events are monitored to determine whether to notify the user about a matching event in the set of events and to determine whether to initiate the advertisement during the matching event. The method also includes initiating the advertisement during the matching event in response to the event data for the matching event meeting the criteria defined by the advertiser.

In another embodiment, an event management system includes an event monitoring engine to monitor a set of events associated with event data. The event management system also includes an advertising module for managing a set of advertisements for an advertiser. The advertising module includes an advertiser preference module to receive a set of advertising preferences. The set of advertising preferences includes advertiser-definable criteria defining when to initiate the set of advertisements. The advertising module also includes an advertisement placement engine to determine whether to initiate an advertisement in the set of advertisements for the monitored set of events. The advertisement placement engine initiates the advertisement in association with an event in the monitored set of events when the event data for the event matches the set of advertising preferences.

DETAILED DESCRIPTION

Figure 1:
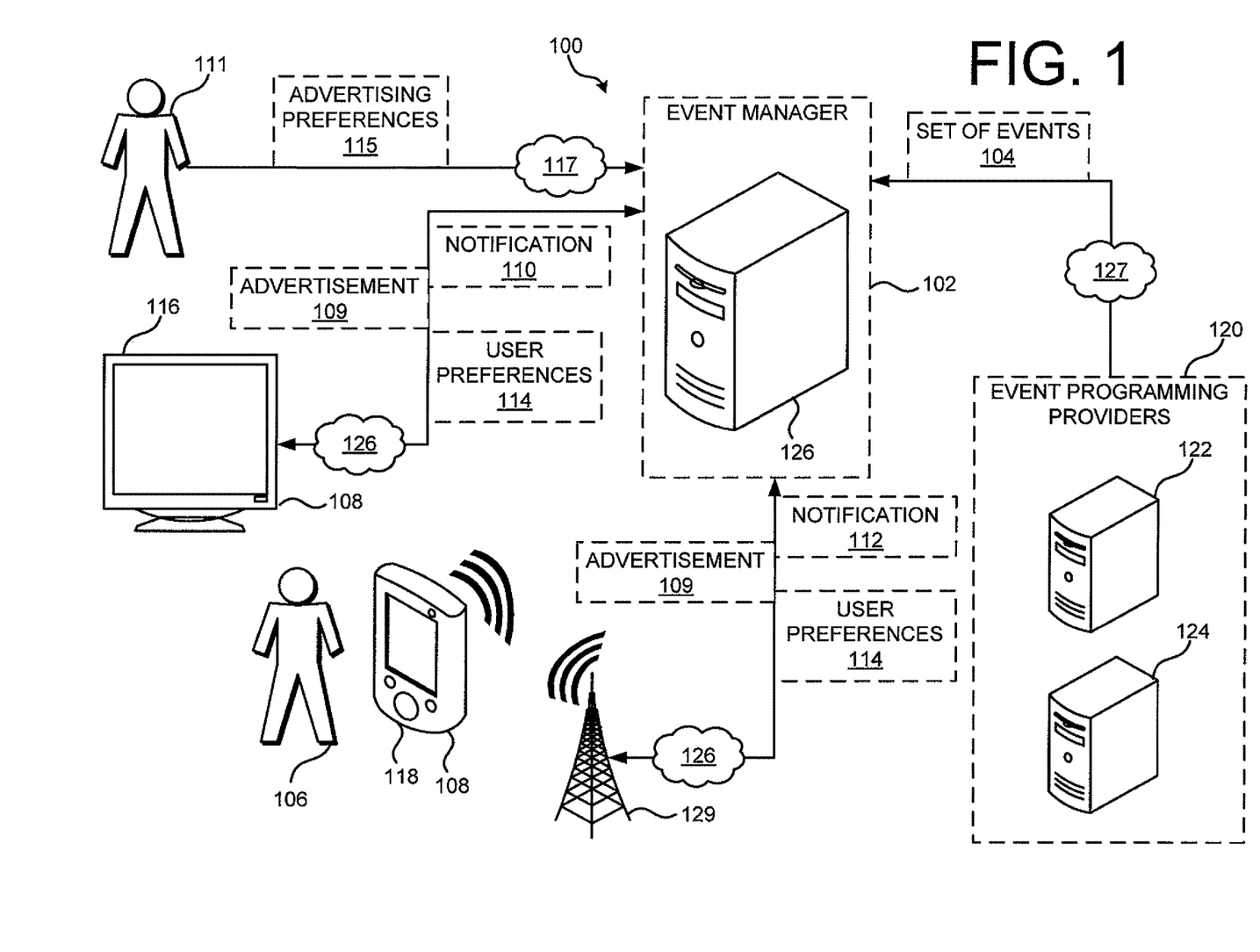
FIG. 1 is a schematic, pictorial representation of an advertisement management system according to an illustrative embodiment.

Referring to FIG. 1, an illustrative embodiment of an advertisement management system 100 includes an event manager 102 that manages a set of events 104 for a user 106 of an interfacing device 108 and a set of advertisements 109 for one or more advertisers 111. Each of the set of events 104 are capable of being viewed on the interfacing devices, and may include television programming, movies, pay-per-view programming, online videos, etc. The event manager 102 allows the user 106 to be notified, via a notification 110 or 112, when all or a portion of an event (i.e., a matching event) in the set of events 104 matches one or more user preferences 114. The user preferences 114 indicate, among other things, the events or portions of events that the user 106 wishes to be made aware. The event manager 102 also initiates advertisements 109 on the interfacing device 108 according to a set of advertising preferences 115 inputted by the advertiser 111 to the event manager 102. The advertising preferences 115 may include advertiser-definable criteria that controls whether or when the advertiser's advertisement 109 is initiated on the interfacing device 108. For example, the advertising preferences 115 may indicate the type of events during which the advertiser 111 desires to run the advertisement 109, as well as any budgetary constraints that should be considered when running the advertisement 109. As used herein, the term "set" encompasses a quantity of one or more. Unless otherwise indicated, as used herein, "or" does not require mutual exclusivity.

The interfacing device 108, which the user 106 may use to interact with the event manager 102, may be any device capable of graphically interfacing with the user 106, such as a cellular phone (e.g., a smart phone), a television, a walkie talkie, a computer (e.g., a laptop, netbook, tablet computer, or minicomputer), a personal digital assistant, a digital music player, a digital reader, a portable gaming device, a web browsing device, a media player, or any other electronic device capable of displaying graphics. In the example of FIG. 1, the interfacing devices 108 with which the user 106 interacts include a television 116 and a cellular phone 118.

In one embodiment, the event manager 102 allows the user 160 select the set of events 104 that interest the user 106 so that the event manager 102 monitors only those events selected by the user 106. The user 106 may then indicate, in his or her user preferences 114, the event portions of interest of which he or she wishes to be notified. The event manager 102 allows the user 160 to be notified in real time when the event, or the event portion of interest, occurs so that the user 106 has the option of immediately viewing the event. An event portion of interest is a portion of any event monitored by the event manager 102 that is of interest to the user 106. Because the interfacing devices 108 that may be used in conjunction with the event manager 102 are numerous, the advertisement management system 100 provides versatility and convenience to the user 106 wishing to view programming of his or her choosing.

In one illustrative example, the user 106 may send the user preferences 114 to the event manager 102 using either the television 116, such as via a remote control (not shown), or the cellular phone 118. By way of real-life example, the user preferences 114 may indicate that the user 106 wishes to be notified when a sporting event, such as a football game, reaches halftime. The event manager 102 monitors the set of events 104 for the event portion of interest (e.g., halftime), and sends either or both of the notifications 110, 112 to the interfacing devices 108 in response to detecting the occurrence of the event portion of interest. The user 106 may be notified in a variety of ways. In an example in which the event manager 102 sends the notification 110 to the television 116, a prompt may appear on the television 116 notifying the user 106 that the event portion of interest (e.g., halftime) has been detected by the event manager 102. In another example, the notification 110 or 112 may cause the event containing the event portion of interest to be displayed in all or a portion of the interfacing devices 108, such as in a picture-in-picture display, split-screen display, or full-screen display. In yet another example, the user 106 may be prompted as to whether he or she desires to switch from watching the currently displayed event on the interfacing devices 108 to the matching event containing the event portion of interest (e.g., the football game). In yet another example, if the notification 110 is sent to the television 116, the user 106 may send a command to the event manager 102 directing the event manager 102 to display the matching event on a device other than the television 116, such as the cellular phone 118.

In another embodiment, the event manager 126 monitors the set of events 104 to determine whether to initiate the advertisement 109 during the event being viewed by the user 106. In making the determination as to whether to initiate the advertisement 109, the event manager 102 compares the advertising preferences 115 of the advertiser 111 with the event data associated with the set of events 104. If the event being viewed by the user 106 meets the criteria defined by the advertiser 111 in the advertising preferences 115, the event manager 102 initiates the advertisement 109 on the interfacing device 108. For example, if the advertising preferences 115 indicate that the advertiser 111 desires to initiate the advertisement 109 during a pre-defined portion of one of the set of events, such as the fourth quarter of a particular football game, the event manager 102 may monitor the set of events 104 and initiate the advertisement 109 on the interfacing devices 108 displaying the fourth quarter of the particular football game.

In another embodiment, the event manager 102 may initiate the advertisement 109 when an advertiser-defined number of users, which may include the user 106, switch to a particular event in the set of events. For example, the advertiser 111 may have an advertising preference 115 to initiate the advertisement 109 when one-thousand (1,000) or more users switch to a particular event. The event manager 102 may also initiate the advertisement 109 based on a combination of criteria in the advertising preferences 115, such as all or a portion of an event being viewed by a pre-defined number of user in combination with other criteria. For example, the advertiser 111 may choose to initiate the advertisement 109 when one-thousand (1,000) or more users switch to a portion of an event defined by the advertiser 111, such as the third period of a hockey game. In another example, the advertiser 111 may choose to initiate the advertisement 109 when five-thousand (5,000) or more users switch to an event having a viewer feedback score exceeding an advertiser-defined threshold. Additional details regarding viewer feedback scores are provided below.

In managing the advertisements 109 for the advertiser 111, the event manager 102 may take into account any budgetary limits or preferences indicated in the advertiser's advertising preferences 115. Because the monetary rate for initiating a particular advertisement 109 may vary depending on the event during which the advertisement 109 is initiated, as well as other factors, the event manager 102 is able to determine a monetary rate at which to charge the advertiser 111 for initiating the advertisement 109, and use this monetary rate to ensure that the advertiser's budget is not exceeded.

The event manager 102, in one embodiment, receives the set of events 104 from one or more event programming providers 120. The event programming providers 120 may be any provider(s) of viewable content, such as cable companies, television channels, Internet service providers, Internet websites, video distribution entities, etc. One or more of the event programming providers 120 may distribute viewable content using one or more servers 122, 124. For example, each of the servers 122, 124 may be used by respective cable or Internet companies that distribute viewable events. In addition, the event manager 102 may be implemented on one or more servers 126 or other data processing systems.

The techniques, technologies, or media by which the components of the advertisement management system 100 intercommunicate are numerous. For example, the advertisement management system 100, or any portion thereof, may be part of a personal area network (PAN), a local area network (LAN), a campus area network (CAN), a metropolitan area network (MAP), or any other network type. Data communication medium 126 between the event manager 102 and the interfacing devices 108 may be any medium through which data can be communicated. For example, the data communication medium 126 may be wired or wireless data connections, and may utilize a virtual private network (VPN), multi-protocol label switching (MPLS), the Internet, or any other data communication media. Data communication medium 127 between the event manager 102 and the event programming providers 120 and data communication medium 117 between the advertiser 111 and the event manager 102 may be of the same or similar type as any of the non-limiting examples provided for the data communication medium 126. Wireless communication between the cellular phone 118 and the base station 129 may utilize any wireless standard for communicating data, such as CDMA (e.g., cdmaOne or CDMA2000), GSM, 3G, 4G, Edge, an over-the-air network, Bluetooth, etc.

In one embodiment, the event manager 102 may be implemented using Internet-based cloud computing. For example, the resources, functionality, and data provided by the event manager 102, as described in the illustrative embodiments, may be accessed by the interfacing devices 108, the user 106, the advertiser 111, or the event programming providers 120 on demand from a "cloud" (not shown). The "cloud" corresponding to the event manager 102 may be located in the advertisement management system 100 at or approximating the location where the event manager 102 is shown.

In one example, the advertisement management system 100 may utilize the Internet, with any combination of the data communication media 117, 126, 127 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. FIG. 1 is intended as an example, and not as an architectural limitation for the different illustrative embodiments.

Figure 2:
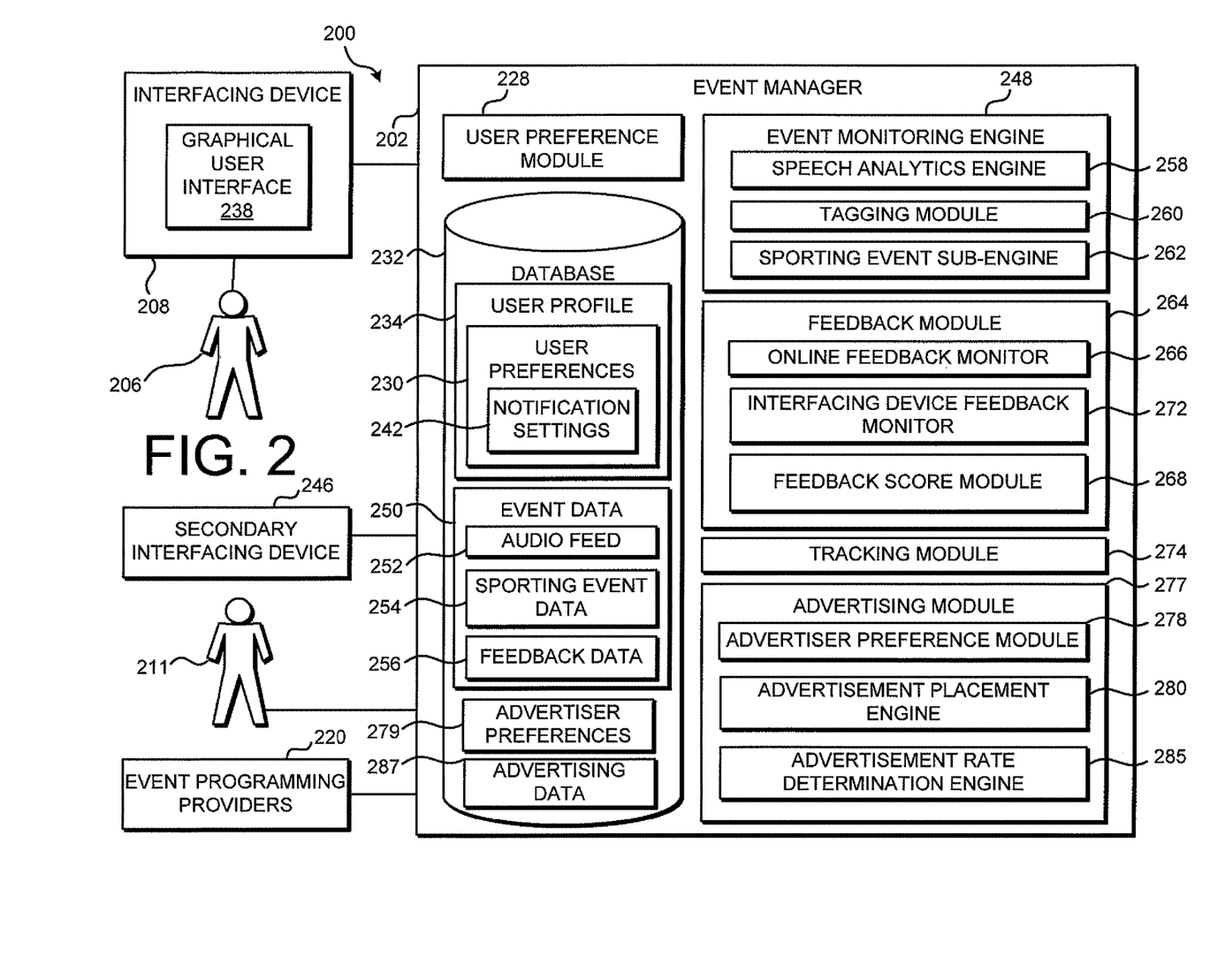
FIG. 2 is a schematic, block diagram of an advertisement management system according to an illustrative embodiment.
Figure 3:
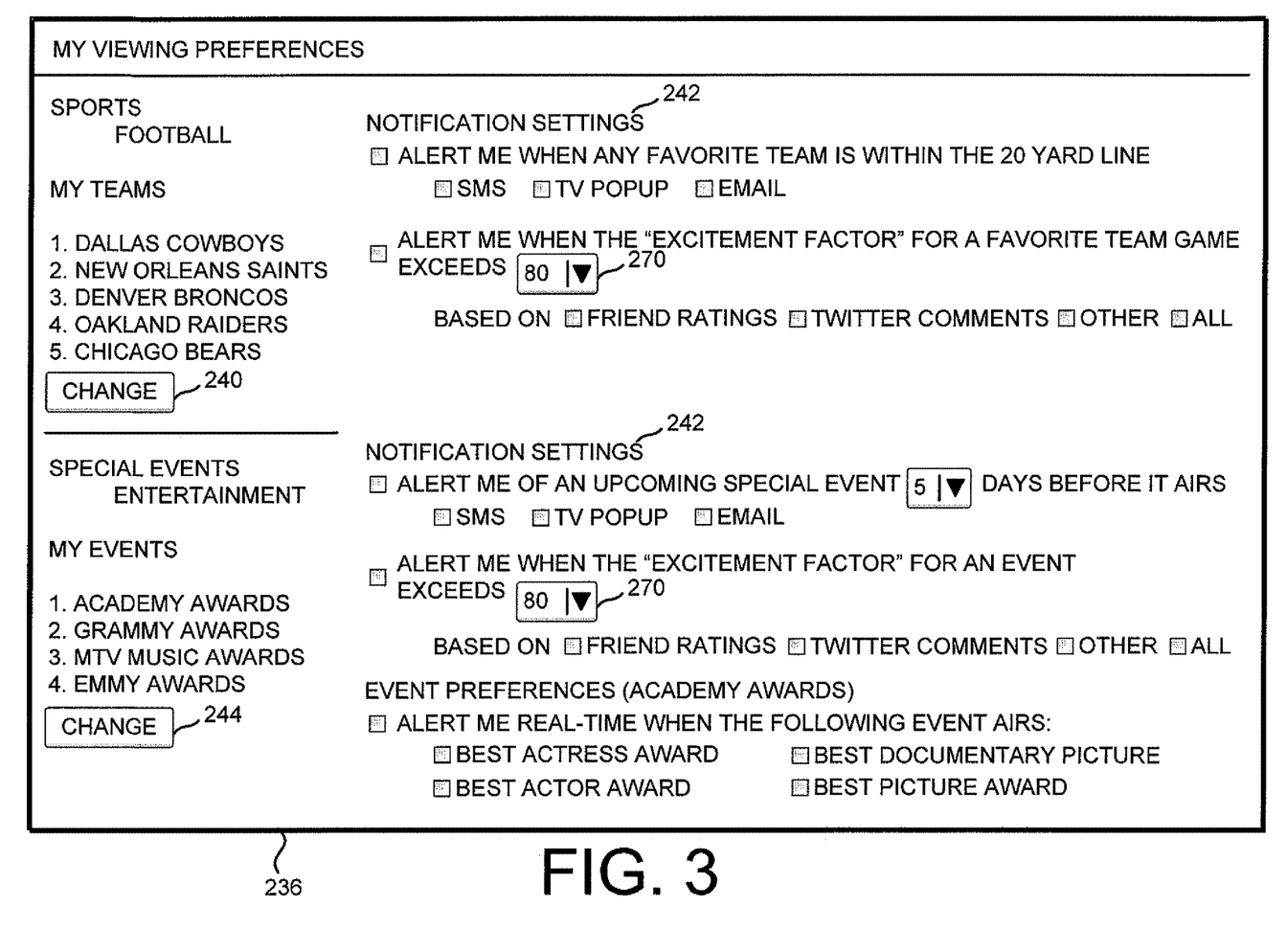
FIG. 3 is a schematic, pictorial representation of a settings interface according to an illustrative embodiment.
Figure 4:
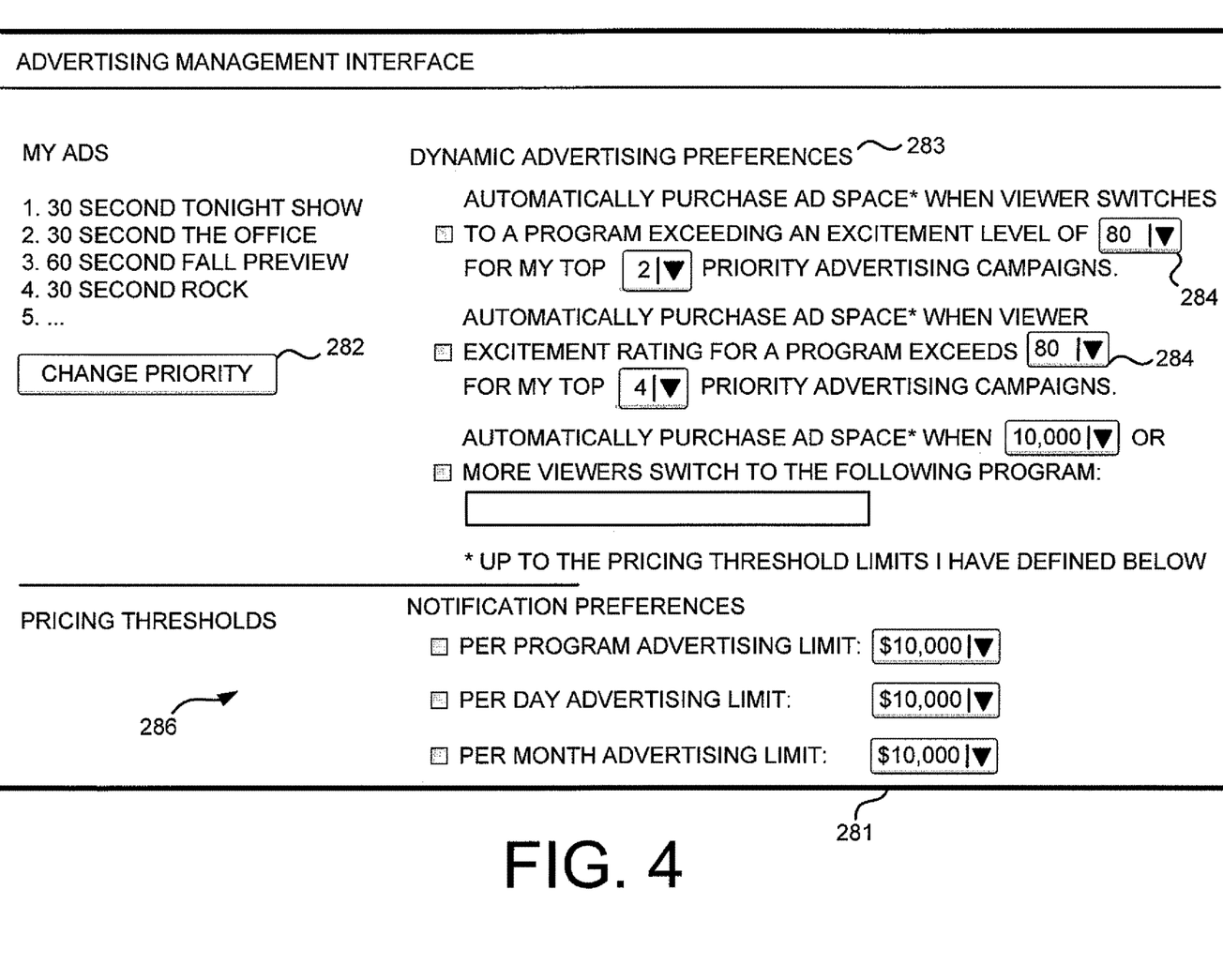
FIG. 4 is a schematic, pictorial representation of an advertising management interface according to an illustrative embodiment.

Referring now to FIGS. 2-4, an illustrative embodiment of the advertisement management system 200 illustrates the elements of the event manager 202. The elements of the event manager 202 shown in FIG. 2 allow the user 206 to be notified when all or a portion of an event of interest has been identified, or otherwise detected, by the event manager 202, and also allows the user 206 to view the event of interest via the interfacing device 208. In one embodiment, the event manager 202 is used by the advertiser 211 to manage a set of advertisements to be initiated on the interfacing device 208 based on a set of advertising preferences defined by the advertiser 211. The event manager 202 may manage events for any number of users, and may manage advertisements for any number of advertisers 211. Components of FIG. 2 that are analogous to components in FIG. 1 have been shown by indexing the reference numerals by 100.

The event manager 202 includes a user preference module 228 which, in one embodiment, solicits or receives the user preferences 230 from the user 206 via the interfacing device 208. The user preferences 230 that are received by the user preference module 228 may be stored in a database 232 or other storage device. The user preferences 230 may also be part of a user profile 234 that contains descriptive information about the user 206, such as the user's name, contact information, subscription information related to the services provided by the event manager 202, financial information (e.g., credit card numbers or payment method), or any other data about the user 206 that may be used to perform any function of the event manager 202. The data in the database 232 may be accessed by any element of the event manager 202. For example, the user profile 234 containing the user preferences 230 may be accessed by the user preference module 228.

The user preferences 230 may be solicited from the user 206 using a settings interface 236 that is displayable on a graphical user interface 238 of the interfacing device 208. An example of the settings interface 236 is shown in FIG. 3.

The settings interface 236 shows a specific and non-limiting example of the types of user preferences 230 that may be selected by the user 206. In particular, the settings interface 236 includes two sections: a sports section and a special events section. The special events section, in the example of FIG. 3, refers specifically to entertainment events. Although the settings interface 236 in FIG. 3 includes two sections, the settings interface 236 may include any number of sections, and each section may pertain to any type of event that is viewable on the interfacing device 208.

Referring to the sports section of the settings interface 236, the user 206 has selected football as his or her sport of interest. The user 206 has also selected the football teams that interest him or her in the My Teams portion of the settings interface 236. These teams of interest may be changed by selecting a change button 240. By selecting these particular football teams, the user 206 has indicated that he or she wishes to be notified when an event related to these teams is occurring, or when a portion of one of these team-related events meets predefined criteria.

The user 206 may be notified in accordance with a set of notifications settings 242 that may be used to indicate when and how the user 206 is notified via the interfacing device 208. In the example of the settings interface 236, the user 206 is allowed the option of selecting to be notified when one of his or her favorite football teams is within the 20 yard line in a football game. Thus, the event portion of interest to the user 206 is when one of his or her favorite football teams is within the 20 yard line. The user 206 may also select whether to be notified via SMS, or text messaging, a TV popup in the graphical user interface 238 of the interfacing device 208, via an e-mail sent to the user's e-mail account, or any combination of these notification methods. Other applicable outbound notification methods may also be used to notify the user 206, such as MMS, video notification, etc.

In the special events section of the settings interface 236, the user 206 has selected entertainment events that are of interest to him or her. These entertainment events may be changed by the user 206 by the selection of a change button 244. The notifications settings 242 in the special events section permit the user 206 to be alerted a user-defined period of time, such as a number of days, before one of the entertainment events airs. The user 206 may also select whether to be notified by SMS, TV popup, or e-mail, or any combination of these.

In addition to the notifications settings 242 shown in the settings interface 236, the user 206 may also be given the option to select from other types of notifications. Some of these notification types have been described above with respect to FIG. 1. Another example of a notification that may be received by the user 206 may be a prompt, displayed in the graphical user interface 238 of the interfacing device 208, which provides the user 206 with one or more options regarding the event of which he or she is notified. This prompt, in one example, may allow the user 206 to select whether or not he or she wishes to view the event, or whether to display the event on a secondary interfacing device 246.

The special events section of the settings interface 236 also allows the user 206 to select event portions of interest of which he or she wishes to be notified in real time. For example, the user 206 may opt to be notified in real time when the Academy Awards airs any of the following event portions of interest: best actress award, best actor award, best documentary picture, or best picture award. The user 206 may also be allowed to enter a custom event portion of interest for which he or she wishes to be notified.

The settings interface 236 represents only one non-limiting example of the user preferences 230 that may be selected by the user 206. Using the illustrative embodiments, the user 206 may be able to select any number or type of events that interest her, including event portions of interest within those selected events, and the user may elect to be notified at any time before, during, or after the airing of those events. The event portions of interest that may be selected by a user as triggering a notification are as numerous as the number of events that are viewable on the interfacing device 208. Also, the events that may be selected by the user 206 are not limited to television programming, but may also include Internet broadcasts, audio feeds, pay-per-view programming, or other viewable content.

Once the user preferences 230 have been received by the user preference module 228 and stored in the database 232, an event monitoring engine 248 may be used to monitor event data 250 for the events being monitored by the event monitoring engine 248 to identify all or a portion of a matching event that matches the user preferences 230. The events that are monitored by the event monitoring engine 248 may be selected by the user 206, such as via the settings interface 236, or may include all of the events received by the event manager 202 or to which the user 206 subscribes. In one embodiment, the events may be received by the event programming providers 220, as described in FIG. 1.

Each of the events monitored by the event monitoring engine 248 has respective event data 250, which is stored in the database 232. The respective event data 250 includes any data associated with the respective event, such as sporting event data 254 (e.g., sporting events statistics or facts), an audio feed 252 of the audio portion of the respective event, any metadata associated with the respective event, or any other descriptive data about the respective event. The event data 250 for each respective event may also include feedback data 256, which is described in further detail below.

In one embodiment, a speech analytics engine 258 may monitor the audio feed 252 of the events monitored by the event monitoring engine 248, and identify all or a portion of a matching event that contains one or more words associated with an event portion of interest. For example, the audio feed 252 may be compared to the user preferences 230 to identify all or a portion of a matching event that has one or more words associated with the user's event portion of interest. To identify the words or phrases in the audio feed that are associated with the event portion of interest to the user 206, the speech analytics engine 258 may utilize speech analytics to extract information about the content of the event being analyzed. Examples of the types of information that may be extracted using speech analytics include the topic(s) of the event, the identity of any speakers in the event, the genders of the speakers in the event, the emotional character of the event, the amount or locations of the speech versus non-speech (e.g., background noise or silence), etc. The audio feed 252 analyzed by the speech analytics engine 258 may be live or pre-recorded audio. Examples of speech analytic approaches that may be used to identify one or more words in the audio feed 252 include the phonetic approach, the Key Word Spotting (KWS) approach, the grammar-based approach, or the Large-Vocabulary Continuous Speech Recognition (LVCSR) approach. In one embodiment, the speech analytics engine 258 may use a phonetic search capability on the voice files, or audio feed, associated with events to identify keywords. The speech analytics engine 258 may be used to allow the event monitoring engine 248 to look for keywords that indicate core events, and the timing of those events that are of interest to the user 206.

In another embodiment, a speech-to-text converter (not shown) may convert the audio feed 252 of any event monitored by the event monitoring engine 248 from audio format to text format to form text data for the event. The event monitoring engine 248 may then monitor the text data. For example, the text data may be compared to the user preferences 230 to identify all or a portion of a matching event that has respective text data containing one or more words associated with the user's event portion of interest. In another embodiment, the user 206 may indicate one or more keywords for which the event monitoring engine 248 searches in the text data.

In another embodiment, a tagging module 260 tags the events monitored by the event monitoring engine 248 with a set of tags. Each of the set of tags describes at least a portion of those events. The tags that are associated with the events by the tagging module 260 become part of the event data 250, and may be used to help identify relevant events, or portions thereof. For example, the tagging module 260 may append one or more tags to a football game event that indicates that the football game is at half time, the two-minute warning, etc. In one example, the tags may be metadata.

The event monitoring engine 248 may access the event data 250 in the database 232, and compare the event data 250 to the user preferences 230 to identify all or a portion of a matching event. The matching event is an event for which at least a portion of the respective event data 250 matches the user preferences 230. By way of non-limiting example, a portion of a matching football game event may be when the user's favorite team is within the 20 yard line. In yet another example, the portion of the matching event that is identified by the event monitoring engine 248 may be the presentation of a best documentary picture award in an entertainment event, such as the Academy Awards. Indeed, the examples of what may qualify as a matching event, or a portion thereof, are numerous.

In one embodiment, the user 206 selects an event portion of interest of which he or she would like to be notified, and the event monitoring engine 248 searches the event data 250 for one or more words associated with the event portion of interest. If the event monitoring engine 248 finds one or more words associated with the event portion of interest in the respective event data 254 for the event, this event, or a portion thereof, is identified. In another embodiment, the user preferences 230 may include one or more keywords selected by the user 206. The event monitoring engine 248 may search for these keywords selected by the user 206, and find all or a portion of the matching event containing these keywords. In another embodiment, the event monitoring engine 248 may search for tags that indicate an event portion of interest or a matching event.

Although the event monitoring engine 248 may monitor any type of viewable event, in one embodiment the event monitoring engine 248 includes a sporting event sub-engine 262 that is specifically geared towards monitoring sporting events. As described above, the event data 250 may include the sporting event data 254 that contains data about sporting events monitored by the event manager 202. The sporting event data 254 may include any statistics or facts about the sporting events monitored by the event monitoring engine 248, such as the score, team position, player names, team names, event location, rankings, player statistics, team statistics, crowd noise level, or any other data that may be ascertained about a sporting event. If the user 206 wishes to monitor a particular sporting event, such as those indicated in the settings interface 236, the sporting event sub-engine 262 may access the sporting event data 254 and monitor the sporting events to identify all or a portion of a matching sporting event that meets the user's user preferences 230. By way of non-limiting example, the user 206 may elect to monitor all playoff games for his or her favorite teams, and be notified when a score is made in any of these games.

In one embodiment, the event manager 202 includes a feedback module 264 to monitor feedback data 256 from multiple users. The feedback data 256, which is part of the event data 250, contains feedback about the events being monitored by the event monitoring engine 248. The feedback data 256 may be collected in a variety of different ways. In one embodiment, the feedback module 264 includes an online feedback monitor 266 that collects the feedback data 256 from a variety of online or other sources. Examples of the online sources from which the online feedback monitor 266 may collect feedback data 256 are numerous, and include social networking websites (e.g., Facebook, MySpace, Twitter, etc.), a public forum website (e.g., a website that allows public comments or opinions), or a blog website. In one non-limiting example, the online feedback monitor 266 may detect a number of instances that a particular event is mentioned or discussed on one or more social networking websites, or any other website, and store this data as the feedback data 256. A relatively large number of instances of an event being mentioned or discussed on the online sources may indicate an elevated excitement level for that event. A feedback score module 268 may then assign a feedback score to one or more of the events monitored by the event monitoring engine 248 based on each of the events' respective feedback data 256. Thus, if a particular event is being extensively discussed on the online sources monitored by the online feedback monitor 266, the feedback score module 268 may assign the extensively-discussed event a higher respective feedback score. This respective feedback score may then be compared to a feedback score threshold that is selected by the user 206. The settings interface 236 illustrates an example of how the user 206 may select a feedback score threshold. In the settings interface 236, the user 206 is asked to select a feedback score threshold 270. The event monitoring engine 248 may then compare the respective feedback score for a particular event with the selected feedback score threshold, and identify the event as a matching event if the respective feedback score for the event meets or exceeds the feedback score threshold 270. Other types of scoring or threshold schemes may be used, such as schemes that are descending instead of ascending, or schemes that are not numerical based.

In another embodiment, the feedback module 264 includes an interface device feedback monitor 272 that collects the feedback data 256 by receiving input from a plurality of interfacing devices associated with a plurality of respective users. For example, each user of a respective interfacing device may provide a score, rank, or other feedback data about an event that he or she is watching, and the totality of this feedback from the plurality of users regarding the event may be collected by the interfacing device feedback monitor 272 and stored as the feedback data 256. In another example, the feedback data 256 may be collected from the multiple interfacing devices via a remote control associated with each of the respective interfacing devices. Thus, each of the users may enter his or her feedback using the remote control associated with their respective interfacing device, such as a television. In the embodiment which includes the interfacing device feedback monitor 272, the feedback score module 268 may assign a feedback score to one or more of the events monitored by the event monitoring engine 248 based on the respective feedback data 256 collected via the interfacing devices associated with the multiple users. The scoring mechanism may be similar to the one described above with respect to the online feedback monitor 266.

Referring back to the settings interface 236 in FIG. 3, each section allows the user 206 to select a source from which to determine the feedback data 256 associated with events selected by the user 206. In the example of the settings interface 236, the user 206 is allowed to select from the following sources: friend ratings (e.g., friend ratings from the user's friends on a social networking website), twitter comments, other sources (including those described above), or all sources available to the feedback module 264.

After the event monitoring engine 248 identifies at least a portion of a matching event that meets the criteria of the user preferences 230, the event manager 202 may send a notification to the interfacing device 208 notifying the user 206 of the matching event, or a portion thereof. The user 206 may be notified by the event manager 202 a variety of ways. In one embodiment, the event manager 202 may send or initiate a prompt on the graphical user interface 238 of the interfacing device 208 that prompts the user 206 to select whether to display the matching event on the graphical user interface 238. If the user 206 opts to display the matching event, the event manager 202 initiates the display of the matching event on the graphical user interface 238. The user 206 may also elect not to view the matching event upon being prompted, in which case the user 206 may continue watching the currently displayed program on the graphical user interface 238.

In another embodiment, in response to receiving the notification from the event manager 202, the user 206 may command, via the interfacing device 208, the event manager 202 to display the matching event on the secondary interfacing device 246. Such an option allows the user 206 some flexibility to choose the device on which the matching event is displayed.

In another embodiment, in response to receiving the notification from the event manager 202, the user 206 may command, via the interfacing device 208, the event manager 202 to record the matching event so that the matching event may be viewed at a later time by the user 206. In one example of this embodiment, if the user 206 chooses to record the matching event, a link, or the recording itself, may be pushed, or otherwise sent, to a device associated with the user 206, such as the interfacing device 208 or the secondary interfacing device 246.

The event manager 202 may also notify the user 206 by sending an SMS, or text message, to the user 206 via an interfacing device such as a cellular phone. In another embodiment, the event manager 202 may display the matching event as a picture-in-picture display on the graphical user interface 238 of the interfacing device 208. In yet another embodiment, the event manager 202 may notify the user 206 by sending an e-mail to an e-mail account associated with the user 206. Indeed, any notification that notifies the user 206 when a matching event, or portion thereof, is found may be used by the event manager 202. Upon receiving the notification, the user 206 may also elect to view the matching event in full or split screen on the graphical user interface 238 of the interfacing device 208.

In one embodiment, the event manager 202 includes an advertising module 277 that allows the advertiser 211 to manage a set of advertisements to be displayed to the user 206 on the interfacing device 208. While the advertising module 277 may be integrated with the notification and viewing functionality of the event manager 202 described above, the advertising module 277 may also act as a stand-alone module that is able to manage any advertisements that are displayable, or otherwise able to interface, with a user using any type of device. In one embodiment, the advertising module 277 includes an advertiser preference module 278 that receives a set of advertising preferences 279 from the advertiser 211, and stores these advertising preferences 279 in the database 232. The advertising preferences 279 may include any criteria, definable by the advertiser 211, that at least partially controls or defines whether or when to initiate the advertiser's advertisements. For example, the advertiser 201 may indicate a particular event, a particular type of event, a portion of an event, or any event data 250 associated with an event that triggers the initiation of the advertiser's advertisement during the event. The initiation of an advertisement "during" an identified event may include initiating the advertisement before, during, or after the event.

Once advertiser preferences 279 have been received and stored by the advertiser preference module 278, the event monitoring engine 248 may monitor a set of events, including the events viewed by the user 206 on the interfacing device 208, so that an advertisement placement engine 280 may determine whether to initiate the advertiser's advertisement in any of the monitored events viewed by the user 206. In determining whether and when to initiate the advertisement, the advertisement placement engine 280 may compare the advertising preferences 279 to the event data 250 associated with the events monitored by the event monitoring engine 248. Once the advertisement placement engine 280 identifies an event being viewed by the user 206 that meets the criteria defined by the advertiser 211, the advertisement placement engine 280 may initiate the advertiser's advertisement on the interfacing device 208.

In one embodiment, the advertisement placement engine 280 may initiate an advertisement for the advertiser 211 when a pre-defined number of users 206 switch to an event monitored by the event monitoring engine 248. The pre-defined number of users 206 required to trigger the initiation of the advertiser's advertisement is definable by the advertiser 211. For example, the advertiser preference module 278 may include the advertiser's 211 preference for the advertisement placement engine 280 to initiate an advertisement when more than fifty-thousand (50,000) users 206 switch to an event being monitored by the event monitoring engine 248. The advertisement placement engine 280 may also initiate an advertisement when a pre-defined number of user 106 switch to an event or a portion of an event defined by the advertiser 211. For example, the advertiser preference module 278 may include the advertiser's 211 preference for the advertisement placement engine 280 to initiate an advertisement when more than fifty-thousand (50,000) users 206 switch to the fourth quarter of a particular football game.

In one embodiment, the advertiser preference module 278 may initiate an advertising management interface 281 that interfaces with the advertiser 211. An example of the advertising management interface 281 is shown in FIG. 4. The advertising management interface 281 may be graphically displayed to the advertiser 211, such as through an interfacing device associated with the advertiser 211. The advertising management interface 281 allows the advertiser 211 to input the advertiser preferences 279. For example, the My Ads section of the advertising management interface 281 allows the advertiser 211 choose and prioritize their advertisements that are to be displayed during the set of events monitored by the event monitoring engine 248. The priority, or the ads themselves, may be changed by the advertiser 211 by selecting a change priority option 282.

The advertising management interface 291 also contains a dynamic advertising preferences section 283 that allows the advertiser 211 to select at least a portion of the advertiser preferences 279. In the example of FIG. 4, the advertiser 211 may indicate a feedback score threshold 284. The feedback module 264 may collect feedback data 256 for the set of events monitored by the event monitoring engine 248 as described in the illustrative embodiments above. Further, as described above, the feedback score module 268 may assign a respective feedback score to at least a portion of the monitored events based on the feedback data 256. The advertisement placement engine 280 may compare the respective feedback scores for the monitored events with the feedback score threshold 284, and initiate the advertisement on all or a portion of the interfacing devices 208 displaying the monitored event if the respective feedback score for the monitored event meets or exceeds the feedback score threshold 284. The dynamic advertising preferences section 283 in the advertising management interface 281 also allows the advertiser 211 to choose the advertisements in the My Ads section to which to apply the feedback score thresholds 284. In the example shown in FIG. 4, ad space is purchased by the advertiser 211 for his or her top two (2) advertisements when a pre-defined number of users 106 switch to an event having a feedback score, or excitement level, exceeding 80. Also shown, ad space is purchased by the advertiser 211 for his or her top four (4) advertisements when the feedback score, or excitement level, for the event exceeds 80. The advertising management interface 281 may also allow the advertiser 211 to define the number of users 106 that must satisfy a certain condition or criteria before initiating the advertisement for that pre-defined number of users 106. For example, as shown in FIG. 4, the advertiser 211 may choose a pre-defined number of users 106 from a drop-down box or other field, and opt to purchase ad space when this pre-defined number of users switch to a program defined by the advertiser 211 in a text field. In other embodiments, the program may be selected from a pre-defined list or by using any other method of selection.

In one embodiment, an advertisement rate determination engine 285 may determine the monetary rate at which to charge the advertiser 211 for an advertisement displayed on the interfacing device 208. The monetary rate determined by the advertisement rate determination engine 285 may be based on any number of factors. For example, the rate determined by the advertisement rate determination engine 285 for a particular advertisement and event may be based on the length of the advertisement, the popularity or rating of the event, the feedback score assigned to the event by the feedback score module 268, the time of day at which the advertisement is aired, etc. In one embodiment, the monetary rate to charge the advertiser 211 for the initiation of an advertisement is based on a number of incremental viewers that switch to the portion of the matching event in which the advertisement is initiated. For example, if multiple users 206 have user preferences 230 indicating that they want to be notified when their favorite football team is in the fourth quarter of a football game, and the advertiser's 211 advertisement airs during the fourth quarter, the monetary rate determined by the advertisement placement engine 280 may be based on the number of incremental viewers that are watching the fourth quarter of the football game as a result of the notification issued by the event monitoring engine 248. The more incremental viewers there are, the more that may be charged to an advertiser 211.

In one embodiment, the advertising preferences 279 may also include budgetary constraints defined by the advertiser 211. For example, the advertiser 211 may indicate one or more advertising spending limits as part of his or her advertising preferences 279. As part of its placement process, the advertisement placement engine 280 may determine whether initiating a particular advertisement causes the advertiser 211 to exceed the advertising spending limit. The advertising placement engine 280 may proceed to initiate the advertisement on the interfacing device 208 if initiating the advertisement does not cause the advertiser 211 to exceed his or her advertising spending limit.

In one embodiment, the advertiser 211 may select advertising spending limits within the advertising management interface 281. As shown in FIG. 4, the advertising management interface 291 includes a pricing thresholds section 286. The pricing thresholds section 286 includes a per-program advertising limit, which indicates the maximum amount the advertiser 211 is willing to spend on advertisements per program, a per-day advertising limit, which indicates the maximum amount the advertiser 211 is willing to spend on advertisements per day, and a per-month advertising limit, which indicates the maximum amount the advertiser 211 is willing to spend on advertisements per month. Each of these advertising limits may be adjusted according to the advertiser's 211 desires by adjusting the limits in the advertising management interface 281.

The event manager 202 also includes a tracking module 274 that monitors and stores notification data regarding the notifications sent by the event manager 202, including user actions taken in response to the notifications. For example, the tracking module 274 may monitor and store the number and type of notifications sent by the event manager 202. The tracking module 274 may also keep track of the number of times that the user 206 switches channels to the matching event in response to receiving the notification. The tracking module 274 may also track the number of times the user 206 viewed the matching event in response to a notification without having to change a channel or switch from a previous program. The tracking module 274 may also keep track of an amount of time after a notification is received for the user 206 to switch to the matching event. The data gathered by the tracking module 274 may be used by the event manager 202, or an administrator thereof, to facilitate the functions of the event manager 202, or provide additional services to other entities associated with the event manager 202.

The tracking module 274 may also monitor and store advertising data 287 regarding the advertisements, initiated or non-initiated, that are associated with the advertiser 211. The advertising data 287 may include, for example, the number of advertisements that are initiated by the advertising module 277 for the advertiser 211, the advertiser-definable criteria included in the advertiser preferences 279 that triggers initiation of an advertisement, one or more portions of events in which an advertisement is initiated, or any other data that assists the advertiser 211 in tracking his or her advertising campaign. The advertising data 287 may be presented to the advertiser 211, such as via an interfacing device, using an advertiser reporting interface (not shown) that graphically displays at least a portion of the advertising data 287. The advertiser 211 may also be notified of any advertising data 287 of particular interest via mobile updates, portal updates, or dynamic notifications.

Figure 5:
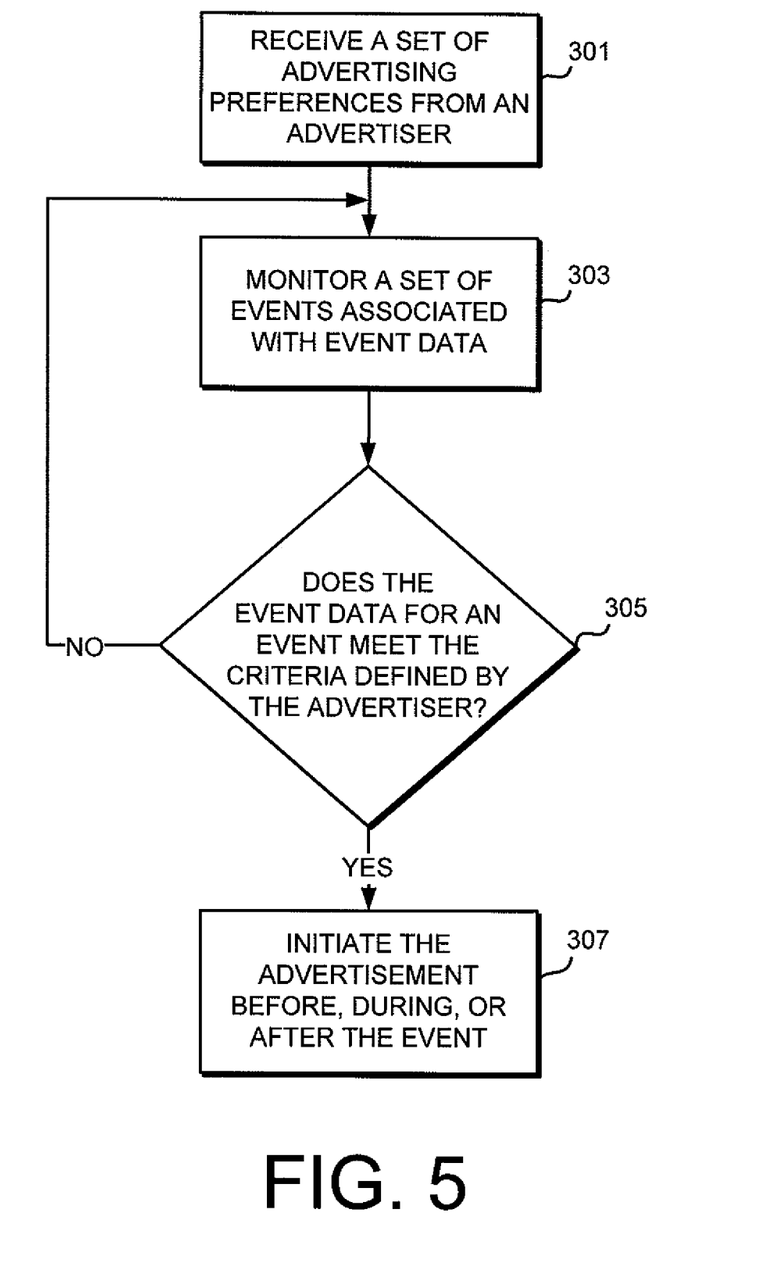
FIG. 5 is a flowchart of a process for managing advertisements for advertisers according to an illustrative embodiment.

Referring to FIG. 5, an illustrative embodiment of a process for managing advertisements for advertisers, which may be executed by the event manager described above, includes receiving a set of advertising preferences from an advertiser (step 301). The process includes monitoring a set of events associated with event data (step 303). The process determines whether the event data for an event meets the criteria defined by the advertiser (step 305). If the process determines the event data for the event does not meet the criteria defined by the advertiser, the process returns to step 303. Returning to step 305, if the process determines that the event data for the event does meet the criteria defined by the advertiser, the process initiates the advertisement before, during, or after the event (step 307).

Figure 6:
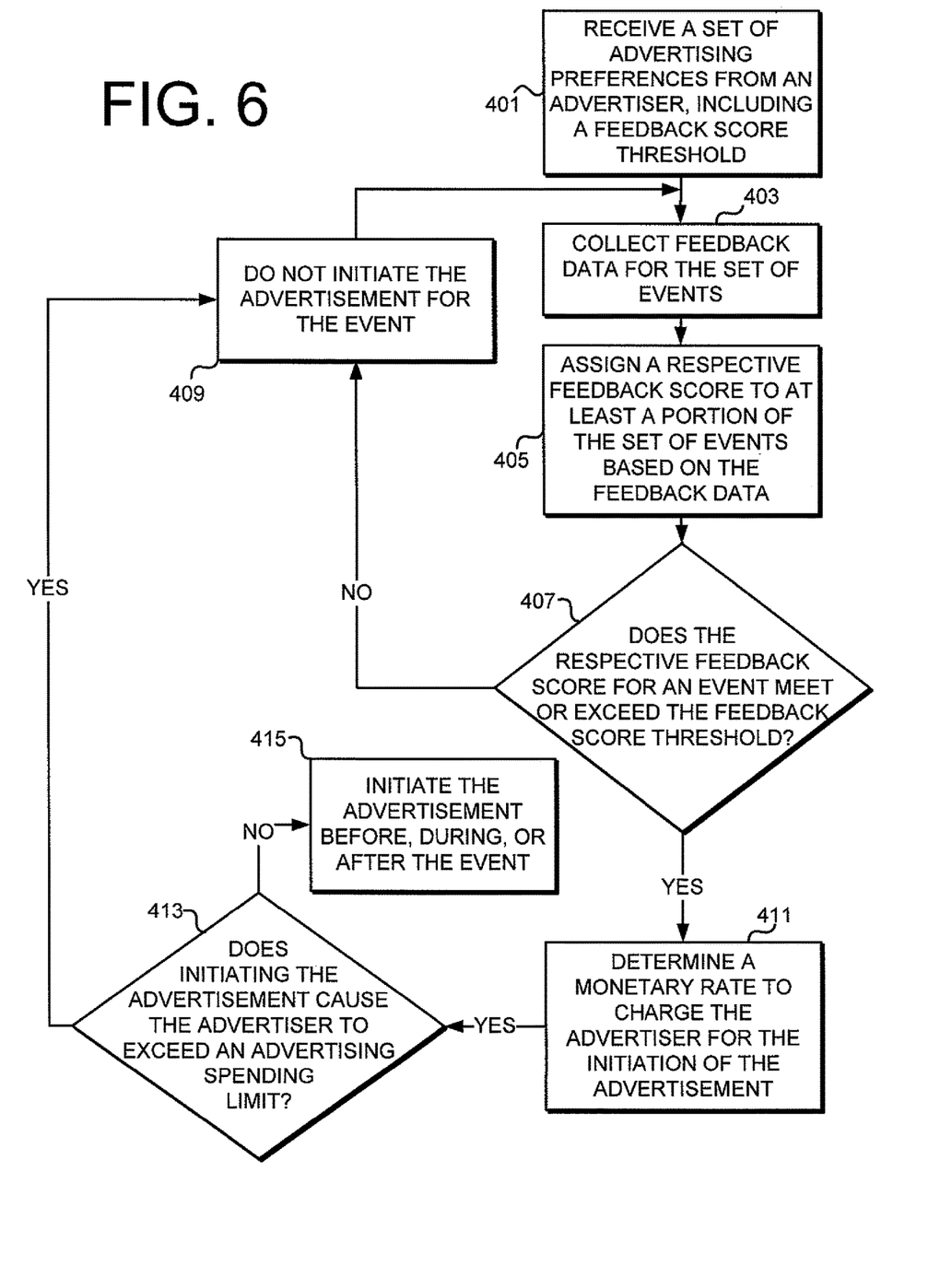
FIG. 6 is a flowchart of a process for managing advertisements for advertisers according to another illustrative embodiment.

Referring to FIG. 6, an illustrative embodiment of a process for managing advertisements for advertisers, which may be executed by the event manager described above, includes receiving a set of advertising preferences from an advertiser, including a feedback score threshold (step 401). The process collects feedback data for the set of events (step 403). The process assigns to respective feedback score to at least a portion of the set of events based on the feedback data (step 405).

The process determines whether the respective feedback score for an event meets or exceeds the feedback score threshold (step 407). If the process determines that the respective feedback score for the event does not meet or exceed the feedback score threshold, the process does not initiate the advertisement for the event (step 409). The process then returns to step 403.

Returning to step 407, if the process determines that the respective feedback score for the event meets or exceeds the feedback score threshold, the process determines a monetary rate to charge the advertiser for the initiation of the advertisement (step 411). The process then determines whether initiating the advertisement causes the advertiser to exceed an advertising spending limit (step 413). If the process determines the initiating the advertisement does not cause the advertiser to exceed the advertising spending limit, the process initiates the advertisement before, during, or after the event (step 415). Returning to step 413, if the process determines that initiating the advertisement causes the advertiser to exceed the advertising spending limit, the process does not initiate the advertisement for the event (step 409).

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the Figures. For example, in some cases, two blocks shown in succession may be executed substantially concurrently, or the blocks may sometimes be executed in the reverse order, depending upon the functionality involved.

Figure 7:
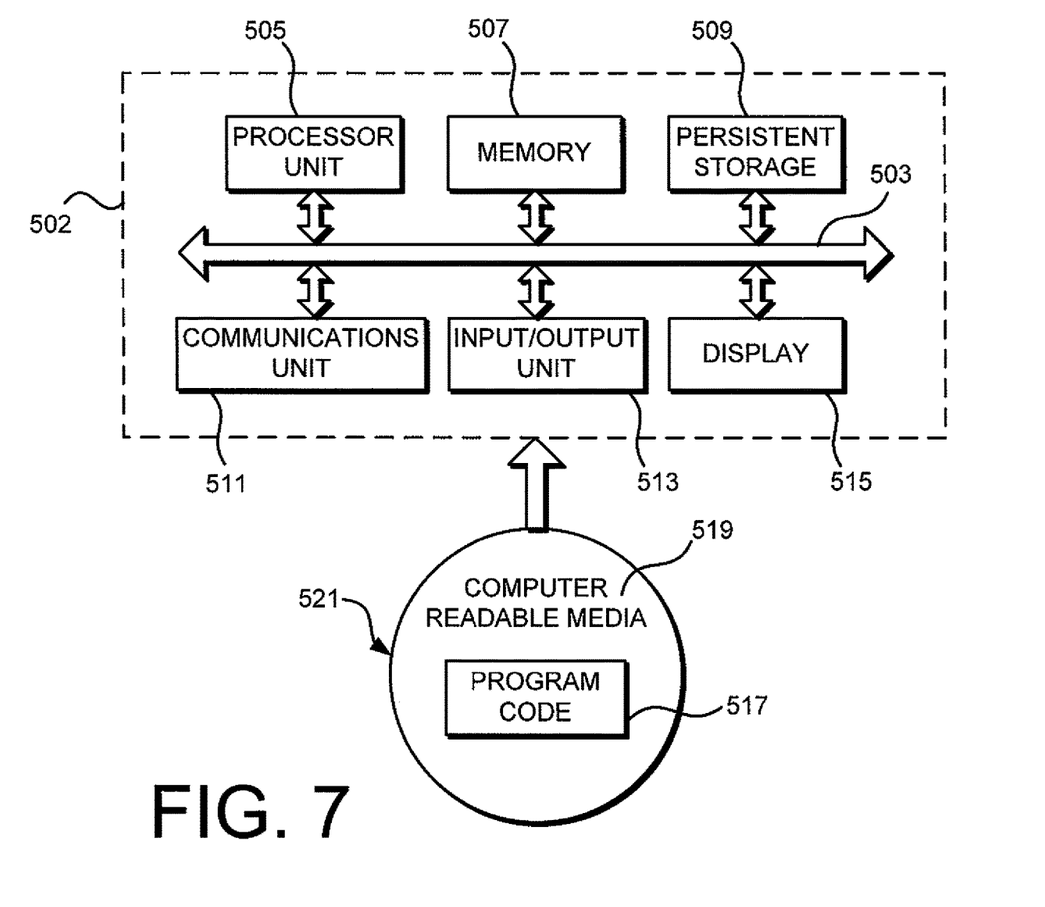
FIG. 7 is a schematic, block diagram of a data processing system in which the illustrative embodiments may be implemented.

Referring to FIG. 7, a block diagram of a computing device 502 is shown in which illustrative embodiments may be implemented. In one embodiment, the event manager 102 or 202 described in FIG. 1 or 2, respectively, may be implemented on the computing device 502. Computer-usable program code or instructions implementing the processes used in the illustrative embodiments may be located on the computing device 502. The computing device 502 includes a communications fabric 503, which provides communications between a processor unit 505, a memory 507, a persistent storage 509, a communications unit 511, an input/output (I/O) unit 513, and a display 515.

The processor unit 505 serves to execute instructions for software that may be loaded into the memory 507. The processor unit 505 may be a set of one or more processors or may be a multi-processor core, depending on the particular implementation. Further, the processor unit 505 may be implemented using one or more heterogeneous processor systems in which a main processor is present with secondary processors on a single chip. As another illustrative example, the processor unit 505 may be a symmetric multi-processor system containing multiple processors of the same type.

The memory 507, in these examples, may be, for example, a random access memory or any other suitable volatile or non-volatile storage device. The persistent storage 509 may take various forms depending on the particular implementation. For example, the persistent storage 509 may contain one or more components or devices. For example, the persistent storage 509 may be a hard drive, a flash memory, a rewritable optical disk, a rewritable magnetic tape, or some combination of the above. The media used by the persistent storage 509 also may be removable. For example, a removable hard drive may be used for the persistent storage 509.

The communications unit 511, in these examples, provides for communications with other data processing systems or communication devices. In these examples, the communications unit 511 may be a network interface card. The communications unit 511 may provide communications through the use of either or both physical and wireless communication links.

The input/output unit 513 allows for the input and output of data with other devices that may be connected to the computing device 502. For example, the input/output unit 513 may provide a connection for user input through a keyboard and mouse. Further, the input/output unit 513 may send output to a processing device. In the case in which the computing device 502 is a cellular phone, the input/output unit 513 may also allow devices to be connected to the cellular phone, such as microphones, headsets, and controllers. The display 515 provides a mechanism to display information to a user, such as a graphical user interface.

Instructions for the operating system and applications or programs are located on the persistent storage 509. These instructions may be loaded into the memory 507 for execution by the processor unit 505. The processes of the different embodiments may be performed by the processor unit 505 using computer-implemented instructions, which may be located in a memory, such as the memory 507. These instructions are referred to as program code, computer-usable program code, or computer-readable program code that may be read and executed by a processor in the processor unit 505. The program code in the different embodiments may be embodied on different physical or tangible computer-readable media, such as the memory 507 or the persistent storage 509.

Program code 517 is located in a functional form on a computer-readable media 519 and may be loaded onto or transferred to the computing device 502 for execution by the processor unit 505. The program code 517 and the computer-readable media 519 form computer program product 521 in these examples. In one embodiment, the computer program product 521 is the event manager 102 or 202 described in FIG. 1 or 2, respectively. In this embodiment, the program code 517 may include computer-usable program code capable of receiving a set of advertising preferences from an advertiser. The set of advertising preferences includes advertiser-definable criteria controlling when to initiate an advertisement associated with the advertiser. The program code 517 may also include computer-usable program code capable of monitoring a set of events associated with event data to determine whether to initiate the advertisement during an event. The set of events are viewable on an interfacing device associated with a user. The program code 517 may also include computer-usable program code capable of initiating the advertisement during the event in response to the event data for the event meeting the criteria defined by the advertiser.

In another embodiment, the program code 517 may include computer-usable program code capable of receiving a set of advertising preferences from an advertiser. The set of advertising preferences includes advertiser-definable criteria defining when to initiate an advertisement associated with the advertiser. The program code 517 may also include computer-usable program code capable of monitoring a set of events associated with event data. The set of events are viewable on an interfacing device associated with a user. The set of events are monitored to determine whether to notify the user about a matching event in the set of events and to determine whether to initiate the advertisement during the matching event. The program code 517 may also include computer-usable program code capable of initiating the advertisement during the matching event in response to the event data for the matching event meeting the criteria defined by the advertiser. Any combination of the above-mentioned computer-usable program code may be implemented in the program code 517, and any functions of the illustrative embodiments may be implemented in the program code 517.

In one example, the computer-readable media 519 may be in a tangible form, such as, for example, an optical or magnetic disc that is inserted or placed into a drive or other device that is part of the persistent storage 509 for transfer onto a storage device, such as a hard drive that is part of the persistent storage 509. In a tangible form, the computer-readable media 519 also may take the form of a persistent storage, such as a hard drive or a flash memory that is connected to the computing device 502. The tangible form of the computer-readable media 519 is also referred to as computer recordable storage media.

Alternatively, the program code 517 may be transferred to the computing device 502 from the computer-readable media 519 through a communication link to the communications unit 511 or through a connection to the input/output unit 513. The communication link or the connection may be physical or wireless in the illustrative examples. The computer-readable media 519 also may take the form of non-tangible media, such as communication links or wireless transmissions containing the program code 517.

The different components illustrated for the computing device 502 are not meant to provide architectural limitations to the manner in which different embodiments may be implemented. The different illustrative embodiments may be implemented in a data processing system including components in addition to or in place of those illustrated for computing device 502. Other components shown in FIG. 7 can be varied from the illustrative examples shown.

As one example, a storage device in the computing device 502 is any hardware apparatus that may store data. The memory 507, the persistent storage 509, and the computer-readable media 519 are examples of storage devices in a tangible form.

In another example, a bus system may be used to implement the communications fabric 503 and may be comprised of one or more buses, such as a system bus or an input/output bus. Of course, the bus system may be implemented using any suitable type of architecture that provides for a transfer of data between different components or devices attached to the bus system. Additionally, the communications unit 511 may include one or more devices used to transmit and receive data, such as a modem or a network adapter. Further, a memory may be, for example, the memory 507 or a cache such as found in an interface and memory controller hub that may be present in the communications fabric 503.

The principles of the present invention can take the form of an entirely hardware embodiment, an entirely software embodiment, or an embodiment containing both hardware and software elements. In one embodiment, the invention is implemented in software, which includes but is not limited to, firmware, resident software, microcode, and other computer readable code.

Furthermore, the principles of the present invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed:

1. A method comprising:
   receiving, by an event manager comprising at least one processor, a set of advertising preferences identifying a predetermined portion of a televised event and a predetermined number of user devices that must switch to the televised event to initiate an advertisement associated with an advertiser during the televised event being displayed, the set of advertising preferences being input via an interface displayed on an interfacing device;
   detecting that a predefined event of the televised event is occurring and displaying, via at least one of picture-in-picture and split-screen, a notification to a plurality of user devices that have requested notifications when the predefined event is detected as occurring;
   determining that the plurality of user devices have switched from a different televised event to the televised event;
   determining, by the event manager, that enough user devices have switched to the televised event to satisfy the predetermined number of user devices in the advertising preferences based on the switching; and
   outputting, by the event manager, the advertisement to display devices of the predetermined number of user devices in response to the determination.

2. The method of claim 1, wherein receiving the set of advertising preferences from the advertiser further comprises receiving an advertising spending limit from the advertiser, the method further comprising:
   determining whether initiating the advertisement causes the advertiser to exceed the advertising spending limit; and
   outputting the advertisement in response to determining that the advertisement does not cause the advertiser to exceed the advertising spending limit.

3. The method of claim 2, wherein receiving the advertising spending limit comprises at least one of receiving a per-program advertising limit, receiving a per-day advertising limit, and receiving a per-month advertising limit.

4. The method of claim 1, wherein the set of advertising preferences comprises a pre-defined number of user devices and an event portion of a game, and wherein the advertisement is initiated during the event portion of the game when the number of user devices viewing the event portion of the game meets or exceeds the pre-defined number of users.

5. The method of claim 1, wherein the televised event is defined by the advertiser in the set of advertising preferences.

6. The method of claim 1, further comprising:
   collecting feedback data for the televised event;
   assigning a respective feedback score to the televised event based on the feedback data; and
   wherein outputting the advertisement during the televised event further comprises initiating the advertisement in response to the respective feedback score for the televised event meeting or exceeding a predetermined feedback score threshold.

7. The method of claim 1, further comprising:
   initiating a display of the interface on the interface device.

8. The method of claim 1, further comprising:
   collecting advertiser data about initiated advertisements associated with the advertiser.

9. The method of claim 8, further comprising:
   initiating an advertiser reporting interface to graphically display at least a portion of the advertiser data to the advertiser.

10. A method comprising:
   receiving, by an event manager comprising at least one processor, a set of advertising preferences identifying a predetermined portion of a televised event and a predetermined number of user devices that must switch to the televised event to initiate an advertisement associated with an advertiser during the televised event being displayed, the set of advertising preferences being input via an interface displayed on an interfacing device;
   detecting that a predefined event of the televised event is occurring and displaying, via at least one of picture-in-picture and split-screen, a notification to a plurality of user devices that have requested notifications when the predefined event is detected as occurring;
   determining that the plurality of user devices have switched from a different televised event to the televised event;
   determining, by the event manager, that enough user devices have switched to the televised event to satisfy the predetermined number of user devices in the advertising preferences based on the switching; and
   outputting, by the event manager, the advertisement to display devices of the predetermined number of user devices in response to the determination,
   wherein the receiving the set of advertising preferences further comprises:
      receiving one or more dynamic advertising preferences for when ad space is automatically purchased, the one or more dynamic advertising preferences comprising:
         automatically purchasing ad space when a predefined number of viewers switch to a program exceeding a predefined excitement level, automatically purchasing ad space when a viewer excitement rating for a program exceeds a predefined excitement rating, or automatically purchasing ad space when a predetermined number of viewers switch to one or more predefined programs.

11. The method of claim 10, further comprising:

initiating the advertisement on a user device during the televised event in response to the user device switching to the televised event.

12. The method of claim 10, further comprising:

determining a monetary rate to charge the advertiser for the initiation of the advertisement based on a number of incremental viewers switching to the televised event in which the advertisement is output.

13. An event management system comprising:

a hardware processor configured to
- receive a set of advertising preferences identifying a predetermined portion of a televised event and a predetermined number of user devices that must switch to the televised event to initiate an advertisement associated with an advertiser during the televised event being displayed, the set of advertising preferences being input via an interface displayed on an interfacing device,
- detect that a predefined event of the televised event is occurring and displaying, via at least one of picture-in-picture and split-screen, a notification to a plurality of user devices that have requested notifications when the predefined event is detected as occurring;
- determine that the plurality of user devices have switched from a different televised event to the televised event;
- determine that enough user devices have switched to the televised event to satisfy the predetermined number of user devices in the advertisement preferences based on the switching, and
- output the advertisement to display devices of the predetermined number of user devices in response to the determination.

14. The event management system of claim 13, further comprising:

a tracking module configured to monitor and store advertising data comprising at least one of a number of advertisements initiated by the advertiser, wherein advertiser-definable criteria triggers when initiation of the advertisement occurs.

15. The event management system of claim 13, further comprising:

an advertisement rate determination engine configured to determine a monetary rate at which to charge the advertiser for the outputting of the advertisement.

16. The event management system of claim 15, wherein the advertisement rate determination engine is further configured to determine the monetary rate based on a number of incremental viewers switching to the televised event in which the advertisement is output.

* * * * *